United States Patent Office 3,342,909
Patented Sept. 19, 1967

3,342,909
PREPARATION OF TRIALKYL PHOSPHATES
FROM DIALKYL PHOSPONATES
Donald M. Fenton, Anaheim, Calif., assignor to Union Oil Company of California, Los Angeles, Calif., a corporation of California
No Drawing. Filed Oct. 26, 1964, Ser. No. 406,551
4 Claims. (Cl. 260—970)

This invention relates to the preparation of trialkyl phosphates and in particular relates to the conversion of dialkyl phosphonates to trialkyl phosphates.

This invention is useful for the preparation of trialkyl phosphates which are useful as plasticizers, fuel additives, lubricant additives, etc. The invention is also applicable to remove traces of dialkyl phosphonate impurities from trialkyl phosphites. The trialkyl phosphites are commonly prepared by the reaction of an alcohol with phosphorus trichloride in the presence of an alkaline material that reacts with and thereby removes the hydrogen chloride formed during the reaction. Quite commonly, slight quantities of the dialkyl phosphonates are formed during this preparation and because of the similarity of their properties to the properties of trialkyl phosphites, these materials are difficult to remove from the trialkyl phosphites. The method of my invention can be applied to convert the dialkyl phosphonate impurities to the trialkyl phosphates which, having distinct physical and chemical properties, can be readily separated from the trialkyl phosphite by conventional methods.

My invention additionally provides for the preparation of trialkyl phosphates from phosphorus trichloride. Conventionally, the trialkyl phosphates have been prepared by the reaction of phosphorus oxychloride or phosphorus pentoxide with alcohols.

It is an object of this invention to provide a method for the preparation of trialkyl phosphates.

It is a further object of this invention to provide a method for the conversion of dialkyl phosphonates to trialkyl phosphates.

Other and related objects will be apparent from the following disclosure.

I have now found that dialkyl phosphonates can be readily oxidized to trialkyl phosphates by reaction with mercuric ions in an anhydrous alcoholic reaction medium. Coincident with the formation of the trialkyl phosphate is the reduction of a stoichiometric quantity of the mercuric ion to free mercury metal.

The reaction can be performed under conditions of temperatures ranging from about 0° to about 300° C. and pressures from about atmospheric to 10,000 p.s.i.g. or more, sufficient to maintain the reactant alcohol in liquid phase. The reaction can be performed in excess of the alcohol reactant which can suitably serve as the reaction solvent. If desired, however, other solvents hereinafter set forth can also be employed.

The reaction is broadly applicable to organic dialkyl phosphonates having the following structure.

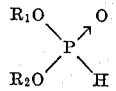

wherein $R_1$ and $R_2$ are alkyl or cycloalkyl groups having from about 1 to about 12 carbons, e.g., methyl, ethyl, isopropyl, butyl, amyl, hexyl, cyclohexyl, heptyl, isooctyl, octyl, nonyl, decyl, undecyl, dodecyl, etc.

Illustrative compounds that can be oxidized in accordance with my invention thus comprise dimethyl phosphonate, ethyl isopropyl phosphonate, propyl amyl phosphonate, cyclohexyl octyl phosphonate, nonyl decyl phosphonate, diethyl phosphonate, propyl nonyl phosphonate, dicyclohexyl phosphonate, cyclohexyl octyl phosphonate, di-tert-butyl phosphonate, etc.

The source of the mercuric ion can be any soluble mercuric salt such as the soluble mercuric carboxylates. In general, mercuric salts of carboxylic acids having from about 1 to about 16 carbons can be employed and the mercuric salts of the aliphatic carboxylic acids are preferred. Most preferably, mercuric carboxylates of the aliphatic carboxylic acids having from 1 to about 6 carbons are employed. Examples of suitable mercuric carboxylates are mercuric acetate, mercuric propionate, mercuric butyrate, mercuric pentanoate, mercuric hexanoate, mercuric octanoate, mercuric laurate, etc.

The reactant alcohol employed can be any primary alcohol corresponding to the particular alkoxy group desired in the final trialkyl phosphate. Generally, aliphatic and alicylic primary monohydroxy alcohols having from 1 to about 25 carbons can be employed to prepare the trialkyl phosphate. Examples of suitable alcohols are, e.g., methanol, ethanol, propanol, butanol, isobutanol, isopropanol, amyl alcohol, isoamyl alcohol, hexanol, cyclohexanol, isohexanol, heptanol, isoheptanol, 3-methyl hexanol-1, lauryl alcohol, 3,4-diethyl heptanol-1, 2-ethylhexanol, etc. Preferably, lower molecular weight alcohols having from 1 to about 6 carbons are employed.

The remainder of the reaction medium can be any organic solvent that is liquid at the reaction condition and is inert to the reactants, e.g., inert to mercuric salts, alcohols and the phosphonates and phosphate reactants. The particular alcohol employed as a reactant can be used in excess and thus comprises the reaction solvent. This is preferred since it simplifies the product recovery steps. If desired, however, other organic solvents can be employed including various ethers such as methyl ethyl ether, diethyl ether, diisopropyl ether, diisoamyl ether, diethylene glycol diethyl ether, tetraethylene glycol dimethyl ether, etc.

Various esters can also be employed as the solvent, e.g., methyl acetate, ethyl acetate, n-propyl propionate, isopropyl acetate, ethyl propionate, n-butyl butyrate, sec-butyl acetate, isobutyl acetate, ethyl-n-butyrate, n-butyl acetate, isoamyl acetate, n-amyl acetate, glycol diformate, furfural acetate, isoamyl n-butyrate, ethyl acetyl acetate, diethyl oxalate, glycol diacetate, isoamyl isovalerate, n-dibutyl oxalate, etc.

The saturated hydrocarbons can of course be used as suitable inert solvents, e.g., pentane, hexane, heptane, octane, decane, dodecane, kerosene, naphtha, etc.

The reaction is performed under conditions including temperatures from about 0° to about 300° C., preferably from about 50° to about 200° C. The reaction can be performed under any desired reaction pressure from about atmospheric pressure to about 10,000 p.s.i.g. or greater. Sufficient pressure should be employed at the selected reaction temperature to maintain liquid phase conditions, i.e., to maintain the chosen reaction solvent or alcohol in liquid phase during the reaction. Such pressures can be from atmospheric pressure to about 1500 p.s.i.g.

The reaction can be performed in a continuous or batchwise fashion. The alcohol and the dialkyl phosphonate together with the mercuric compounds can be introduced into the reaction zone, heated to the reaction temperature and held at the reaction temperature until the reaction has been essentially completed, as evidenced by the reduction of the mercuric compound to the free mercury. In a continuous operation, the dialkyl phosphonate can be introduced together with makeup reaction medium comprising the reactant alcohol and necessary quantity of the mercuric compound into the reaction zone maintained at the desired reaction conditions. A portion of the liquid reaction product can be continuously withdrawn from the reaction zone and treated to recover the reaction products.

The reaction product can be cooled and readily decanted or filtered to separate the organic products from the mercury. The organic products are thereafter distilled to remove the volatile solvents and excess alcohol reactant which can be recycled to further contacting. Final purification of the product can be effected by known methods for purification of phosphate esters, e.g., distillation, solvent extraction, etc. The mercury can be subjected to known oxidizing conditions to oxidize the mercury to its soluble mercuric salt or oxide or recycling to the reaction. Various oxidants can be employed in this step, e.g., oxygen, nitric acid, chromic acid, permanganates, ozone, and mixtures thereof at temperatures from about 0° to about 250° C., to reoxidize the mercury to the soluble mercuric salt for recycling to the reaction. When mercuric carboxylates are employed, particularly the preferred mercuric acetate, the mercury is combined with acetic acid and contacted with oxygen to form mercuric acetate that is recycled to further contact.

The following example will illustrate a mode of practicing my invention and demonstrate results obtainable thereby:

*Example*

Into a 300 milliliter steel bomb was introduced 20 grams dibutyl phosphonate, 31 grams mercuric acetate and 100 milliliters n-butanol. The bomb was closed and heated to 50° C. and held at that temperature for 2 hours while rocking. The bomb was then heated to 110° C. and held at that temperature for 2 hours and finally, heated to 200° C. and held at that temperature for 2 further hours. Upon completion of the reaction period the bomb was cooled, depressured and opened and the liquid contents were decanted to separate the organic layer from the mercury. The organic layer was filtered and the filtrate was distilled to remove excess n-butanol, and acetic acid from the product. Further distillation yielded 6 grams of dibutyl phosphonate, boiling point 38–41°/2 mm. mercury pressure and then 16 grams of tributyl phosphate, boiling point 114–120°/2 mm. mercury pressure. The tributyl phosphate distillate exhibited a confirming infrared spectrum.

Substantially the same results can be obtained simply by substituting dicyclohexyl phosphonate for the dibutyl phosphonate of the preceding example to prepare dicyclohexyl butyl phosphate.

The preceding example is intended solely to illustrate a mode of practicing the invention and demonstrate the results obtainable therewith. The example is not intended to be unduly limiting of my invention which is intended to be defined by the method steps and their obvious equivalents set forth by the claims.

I claim:

1. The oxidation of dialkyl phosphonates having the following structure:

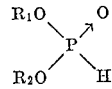

wherein $R_1$ and $R_2$ are selected from the class consisting of cycloalkyl and alkyl groups having from about 1 to about 12 carbons; to trialkyl phosphates therefrom that comprises contacting said dialkyl phosphonate with a primary monohydroxy alcohol having 1 to about 25 carbons in the presence of a soluble mercuric carboxylate at a temperature between about 0° and about 300° C. and a pressure from atmospheric pressure to about 10,000 p.s.i.g., sufficient to maintain said alcohol in liquid phase.

2. The oxidation of claim 1 performed at a temperature from 50° to 200° C. and a pressure from atmospheric pressure to about 1500 p.s.i.g.

3. The oxidation of claim 1 wherein said dialkyl phosphonate is dibutyl phosphonate.

4. The oxidation of claim 1 wherein said mercuric carboxylate is a carboxylate of an aliphatic carboxylic acid having from to to about 6 carbons.

References Cited

UNITED STATES PATENTS 2,952,699   9/1960   Norman _____ 260—985

CHARLES B. PARKER, *Primary Examiner.*

B. BILLIAN, *Assistant Examiner.*

UNITED STATES PATENT OFFICE
CERTIFICATE OF CORRECTION

Patent No. 3,342,909　　　　　　　　　　　September 19, 1967

Donald M. Fenton

It is hereby certified that error appears in the above numbered patent requiring correction and that the said Letters Patent should read as corrected below.

In the heading to the printed specification, line 3, for "PHOSPONATES" read -- PHOSPHONATES --; column 4, line 35, for "to", first occurrence, read -- 1 --.

Signed and sealed this 12th day of November 1968.

(SEAL)
Attest:

Edward M. Fletcher, Jr.　　　　　　　　　　　EDWARD J. BRENNER
Attesting Officer　　　　　　　　　　　　　　Commissioner of Patents